United States Patent [19]

Lee

[11] Patent Number: 5,860,888

[45] Date of Patent: Jan. 19, 1999

[54] AUTOMATIC TRANSMISSION WITH A TOROIDAL CVT AND A BELT TYPE CVT FOR VEHICLE

[75] Inventor: Chungseob Lee, Kyungki-si, Rep. of Korea

[73] Assignee: Hyundai Motor Co., Seoul, Rep. of Korea

[21] Appl. No.: 877,905

[22] Filed: Jun. 18, 1997

[30] Foreign Application Priority Data

Jun. 18, 1996 [KR] Rep. of Korea .................. 1996-22008

[51] Int. Cl.[6] .................................................. F16H 37/08
[52] U.S. Cl. .......................... 475/210; 475/214; 475/216
[58] Field of Search .............................. 74/745; 475/210, 475/214, 215, 216, 217

[56] References Cited

U.S. PATENT DOCUMENTS

| | | | |
|---|---|---|---|
| 1,056,292 | 3/1913 | Nettenstrom | 475/216 |
| 2,646,696 | 7/1953 | Kepes | 475/216 |
| 4,136,581 | 1/1979 | Winter et al. | 475/216 |
| 4,241,618 | 12/1980 | Smirl | 475/214 X |
| 4,402,237 | 9/1983 | Tomlinson | 475/214 |
| 4,772,247 | 9/1988 | Stockton | |
| 5,564,998 | 10/1996 | Fellows | 475/216 |

*Primary Examiner*—Khoi Q. Ta

[57] ABSTRACT

A continuously variable transmission for a vehicle includes first and second continuously variable shift parts. A torsional damper for absorbing torsional vibration caused by a change in engine torque is connected to an output shaft of an engine. A forward/reverse control mechanism for controlling forward and reverse drive of the vehicle is connected to said damping means. The first continuously variable part is connected to the forward/reverse control means through a first power transmission member. The second continuously variable shift part transmits shifted rotating force to a final reduction gear system.

17 Claims, 10 Drawing Sheets

AUTOMATIC TRANSMISSION WITH A TOROIDAL CVT AND A BELT TYPE CVT FOR VEHICLE

FIELD OF THE INVENTION

The present invention relates to a continuously variable transmission (CVT) for a vehicle.

BACKGROUND OF THE INVENTION

Continuously variable transmissions are increasingly used. This is a result of the advantage of CVTs which is that shift shock is avoided by enabling speed ratios to be varied in a continuous fashion.

However, conventional continuously variable transmissions which are well known at present have problems that whole shift range is so limited, deteriorating fuel consumption ratio and driving performance. The U.S. Pat. No. 4,772,247 discloses such a continuously variable transmission.

For the foregoing reasons, there is a need for a continuously variable transmission which has an enlarged shift range to improve the fuel efficiency and driving performance.

SUMMARY OF THE INVENTION

In view of the foregoing, it is an object of the present invention to provide a continuously variable transmission which can provide a large whole shift range, thereby improving the fuel consumption ratio and driving performance of the vehicle.

To achieve the above object, the present invention provide a continuously variable transmission for a vehicle, comprising:

damping means for absorbing torsional vibration caused by a change in engine torque, said damping means being connected to an output shaft of an engine;

forward/reverse control means for controlling forward and reverse drive of the vehicle, said forward/reverse control means being connected to said damping means;

first shift means for continuously variably shifting rotating force transmitted from the forward/reverse control means, said first shift means being connected to the forward/reverse control means through a first power transmission member; and second shift means for continuously variably shift rotating force, which is continuously variable shifted in said first shift means, and transmitting shifted rotating force to a final reduction gear system, said second shift means being connected to the first shift means through a second power transmission member.

Preferably, the forward/reverse control means comprises a double-pinion planet gear set.

The first shift means can be comprised of an input disk having a variable diameter portion; an output disk having a variable diameter portion and disposed symmetrically with respect to the input disk; at least one roller disk disposed between and friction-contacting the variable diameter portions of the input and output disks; and drive means for variably moving the roller disk on the variable diameter portions.

The damping means comprises a torsional damper or a torque convertor.

The second shift means comprises a drive pulley assembly having fixed and variable pulleys so as to vary diameter thereof, the drive pulley being connected to the first shift means through the second power transmission member; and a driven pulley assembly having fixed and variable pulleys so as to vary diameter thereof, the driven pulley being connected to the final reduction gear system through the third power transmission member.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Reference will now be made in detail to the present preferred embodiment of the invention, an example of which is illustrated in the accompanying drawings. Wherever possible, the same reference numbers as the described prior art will be used in the drawing to refer to the same or like parts and the description thereof will be omitted.

Figure 1:
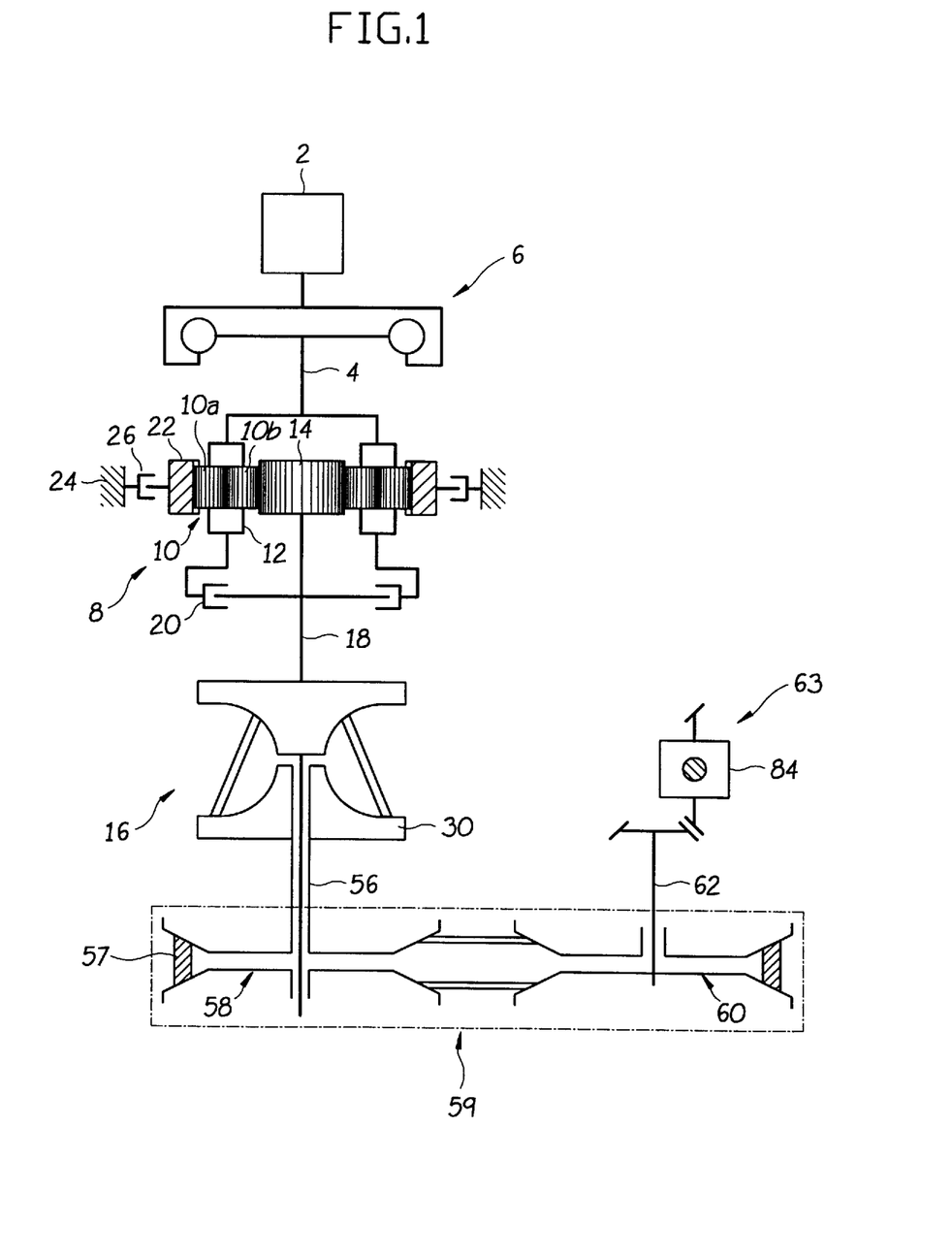
FIG. 1 is a schematic diagram illustrating a continuously variable transmission according to a first embodiment of the present invention.

Referring first to FIG. 1, there is shown a schematic diagram of a continuously variable transmission according to a first embodiment of the present invention.

The inventive CVT according to this embodiment has a torsional damper 6 disposed on an output shaft 4 connected at its one end to an engine 2. The torsional damper 6 acts to absorb torsional vibrations caused by torque changes of the engine 2.

The other end of the output shaft 4 is connected to a forward/reverse control mechanism 8 for controlling forward/reverse drive of a vehicle. The forward/reverse control mechanism 8 receives torque of the engine through the output shaft 4. The forward/reverse control mechanism 8 is comprised of a planetary gear unit having a sun gear 14, a ring gear 22, a plurality of double pinion gear sets each of which has paired pinion gears 10 meshing with each other and with the ring and sun gears 22 and 14, respectively, and planet carriers 12 interconnecting the paired double pinion gears 10. The planet carriers 12 are connected to the output shaft, thereby acting as an input element. The sun gear 14 is connected to a first continuously variable shift part 16 through a power transmission shaft 18, thereby acting as an output element.

Interposed between the power transmission shaft 18 and each of the planet carriers 12 is a first friction element 20 so that the planet carriers 14 can be selectively engaged with the sun gear 14 according to the operation of the first friction element 20.

A second friction element 26 is interposed between the ring gear 22 and a transmission housing 24 such that the ring gear 22 can selectively act as a reacting element in accordance with the operation of the second friction element 26.

The first friction element 20 is a multiple disk clutch, while the second friction element 26 is a band brake.

Figure 2:
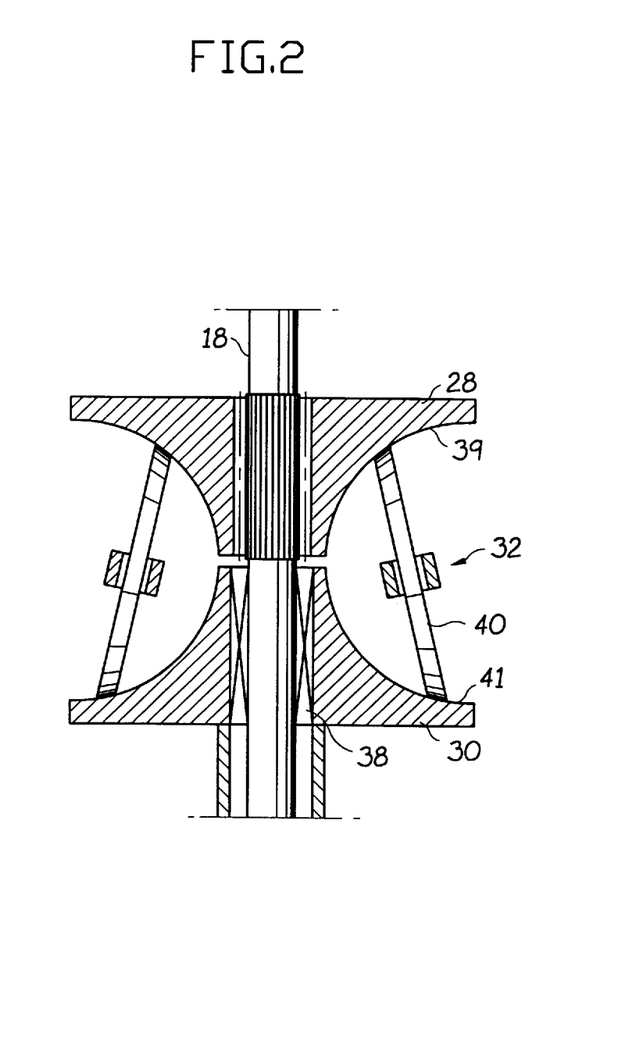
FIG. 2 is an enlarged partial sectional view showing a first continuously variable shift part depicted in FIG. 1.

The first continuously variable shift part 16 comprises, as shown in FIG. 2, a truncated cone-shaped input disk 28, a truncated cone-shaped output disk 30, and roller disk assemblies 32 disposed between the input and output disks 28 and 30. Outer surfaces of the input and output disks 28 and 30 are designed having a curvature faces 39 and 41. The input and output disks 28 and 30 are symmetrically disposed to each other such that the curvature faces 34 and 36 define a semi-circular profile.

The input disk 28 is splined to the first power transmission member 18 so as to rotate therewith, while the output disk 30 is spaced away from the input disk 28 and carried on the first power transmission member 18 by a bearing 38. Therefore, the input and output disks 28 and 30 do not interfere in their mutual motion.

As described above, the roller disk assemblies 32 are disposed between the input and output disks 28 and 30. Each of the roller disk assemblies 32 comprises a roller disk, an outer circumference of which is in frictional contact with the curvature faces 39 and 41 of the input and output disks 28 and 30.

Figure 3:
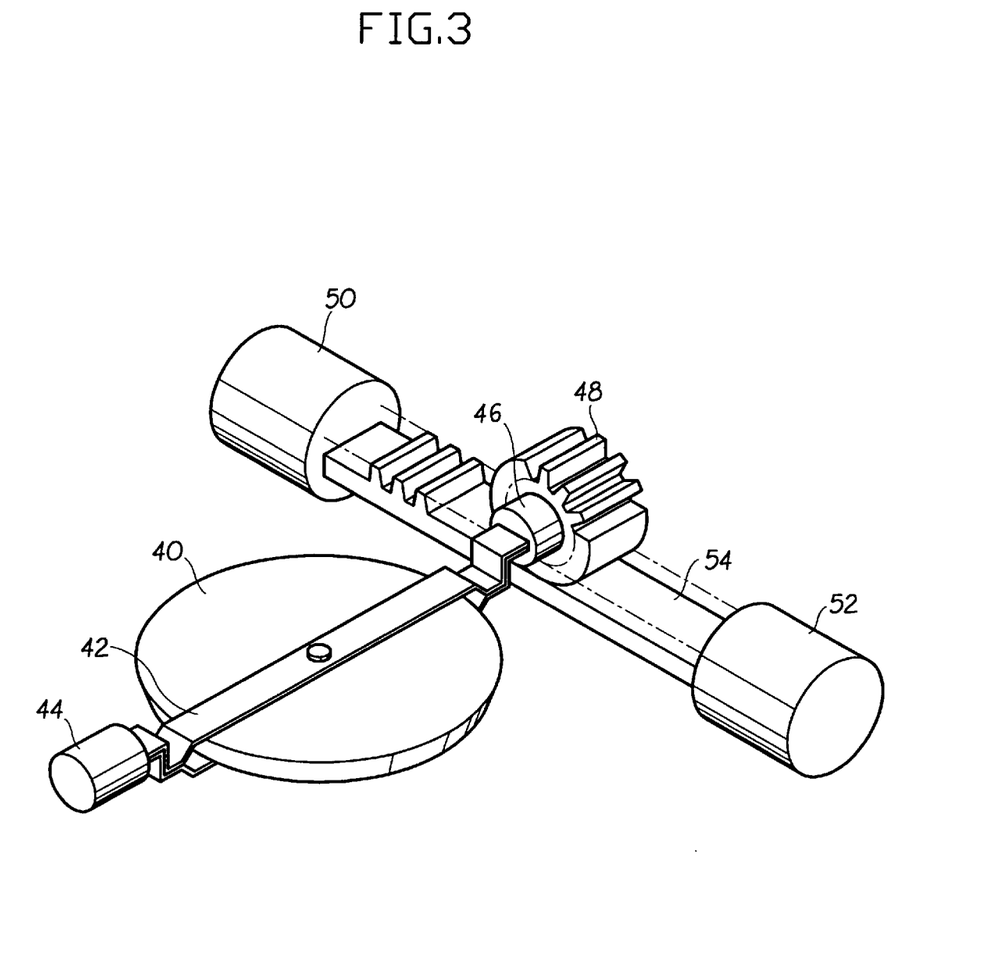
FIG. 3 is a perspective view showing a roller disk assembly of the first continuously variable shift part depicted in FIG. 2.

More in detail, the roller disk assembly 32, as shown in FIG. 3, further comprises a supporting member 42 rotatably supporting a roller disk 40, first and second journals 44 and 46 formed on both ends of the supporting member 42, a pinion 48 mounted on the second journal 46, a rack 54 engaged with the pinion 48 so as to rotate the pinion 48, and pistons 50 and 52 disposed on opposite ends of the rack 54 so as to reciprocate the rack 54.

The pistons 50 and 52 are inserted into cylinders formed on the transmission housing, such that they can reciprocate by hydraulic pressure which is fed to the cylinders in accordance with vehicle's driving condition. By the reciprocation of the rack 54, the pinion 48 rotates, thereby rotating the roller disk 40. The journals 44 and 46 are rotatably supported on the transmission housing.

Referring again to FIG. 1, the output disk 30 of the first continuously variable shift part 16 is connected to a second continuously variable shift part 59 through a second power transmission member 56.

Figure 4:
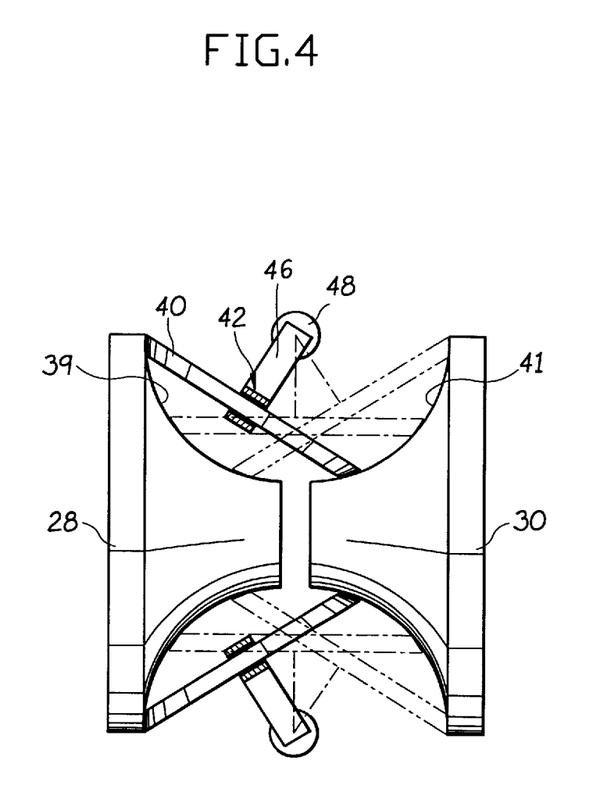
FIG. 4 is a view illustrating the first continuously variable shift part depicted in FIG. 2 in an operational state.

Describing the operation of the first shift part 16 with reference to FIG. 4, as the pistons 50 and 51 reciprocate according to the vehicle's running condition, the roller disk 40 rotates while varying the contact diameter on the curvature faces 39 and 41, thereby achieving the continuously variable shift operation.

Figure 5:
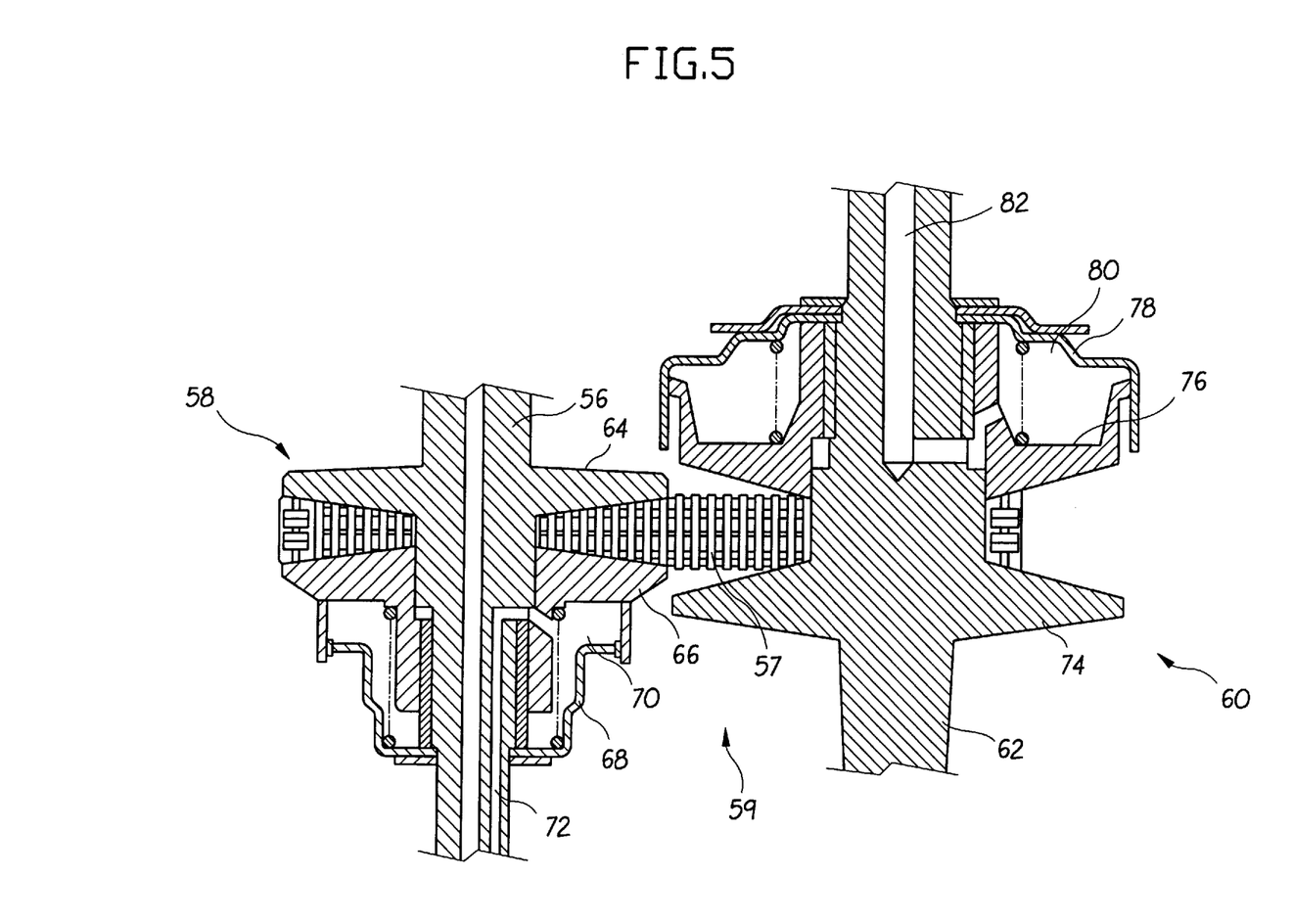
FIG. 5 is a detailed sectional view of a second continuously variable shift part depicted in FIG. 1.

As shown in FIG. 5, the second continuously variable shift part 59 comprises a drive pulley assembly 58 having a variable outer diameter and a driven pulley assembly 60 connected to the drive pulley assembly 58 through a belt 57. The driven pulley assembly 60 also has a variable outer diameter and a central shaft connected to a final reduction gear system 63 (see FIG. 1) through a third power transmission member 62.

Describing more in detail, the drive pulley assembly 58 comprises a fixed pulley 64 and a variable pulley 66, the fixed pulley 64 being integrally formed with the second power transmission member 56 connected to the output disk 30, and the variable pulley 66 is carried around the second power transmission member 56 to be movable along an axis of the member 56.

A casing member is mounted on a side of the variable pulley 66 so as to define a hydraulic chamber 70. Hydraulic pressure generated when an engine is operated is designed to be fed to the hydraulic chamber 70 through a hydraulic passage 72 formed along the second power transmission member 56.

The driven pulley assembly 60 includes a fixed pulley 74 and a variable pulley 76, the fixed pulley 76 being integrally formed with the third power transmission member 62. The variable pulley 76 of the driven pulley assembly 60 is carried around the third power transmission member 62 to be movable along an axis of the third power transmission member 62. A casing member 78 is mounted on a side of the variable pulley 76 so as to define a hydraulic chamber 80. Hydraulic pressure generated when the engine is operated is designed to be supplied to the hydraulic chamber 80 through a hydraulic passage 82 formed on the third power transmission member 62.

In the present invention, the structures of the drive and driven pulley assemblies are not limited to the above described structure. Any structure which can perform a continuously and variable shift operation can be used.

Referring again to FIG. 1, the final reduction gear system 63 connected to the third power transmission member 62 of the driven pulley assembly 60 includes a differential 84. Since the structure of the differential 84 is conventional, the description thereof will be omitted.

Figure 6:
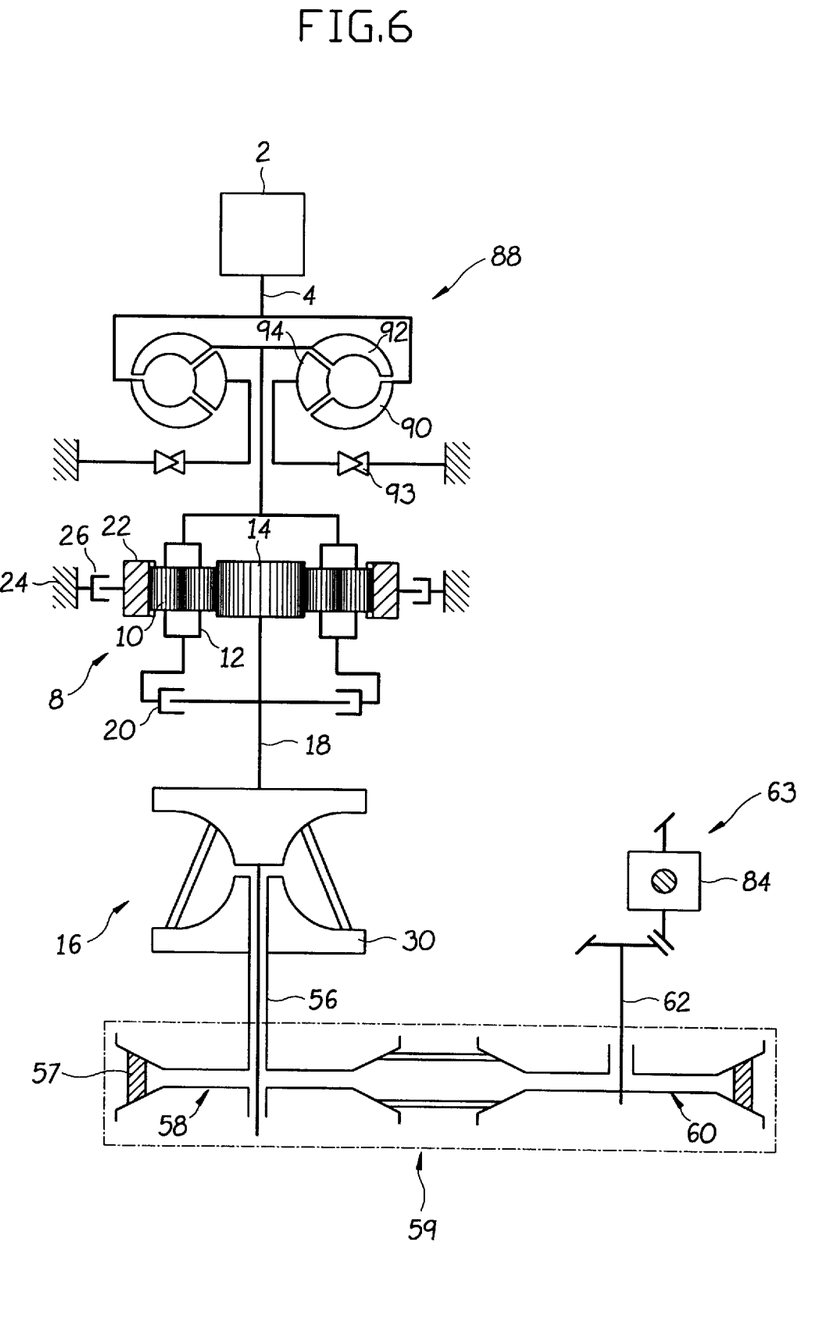
FIG. 6 is a schematic diagram illustrating a continuously variable transmission according to a second embodiment of the present invention.

Referring to FIG. 6, there is shown a schematic diagram of a continuously variable transmission according to a second embodiment.

In this embodiment, the torsional damper 6 which is used for absorbing a torsional vibration of the output shaft 4 in the first embodiment is replaced with a torque convertor 88.

The torque convertor 88 comprises a pump impeller 90 directly connected to the output shaft 4 of the engine 2, a turbine runner 92 disposed facing the pump impeller 90 so as to rotate by fluid, and a stator disposed between the pump impeller 90 and the turbine runner 92 so as to change the flow direction of hydraulic pressure and thus increase the rotating force of the pump impeller 94.

Therefore, when the engine is operated, fluid filled within the torque convertor 88 is fed to the turbine runner 92 through the pump impeller 90, so as to drive the turbine runner 92 and then flows into the stator 94. After this, the fluid flowed into the stator 94 is returned to the pump impeller 90. This operation is repeated, and a change in torque is achieved by difference in rotating force between the turbine runner 92 and the pump impeller 90.

Figure 7:
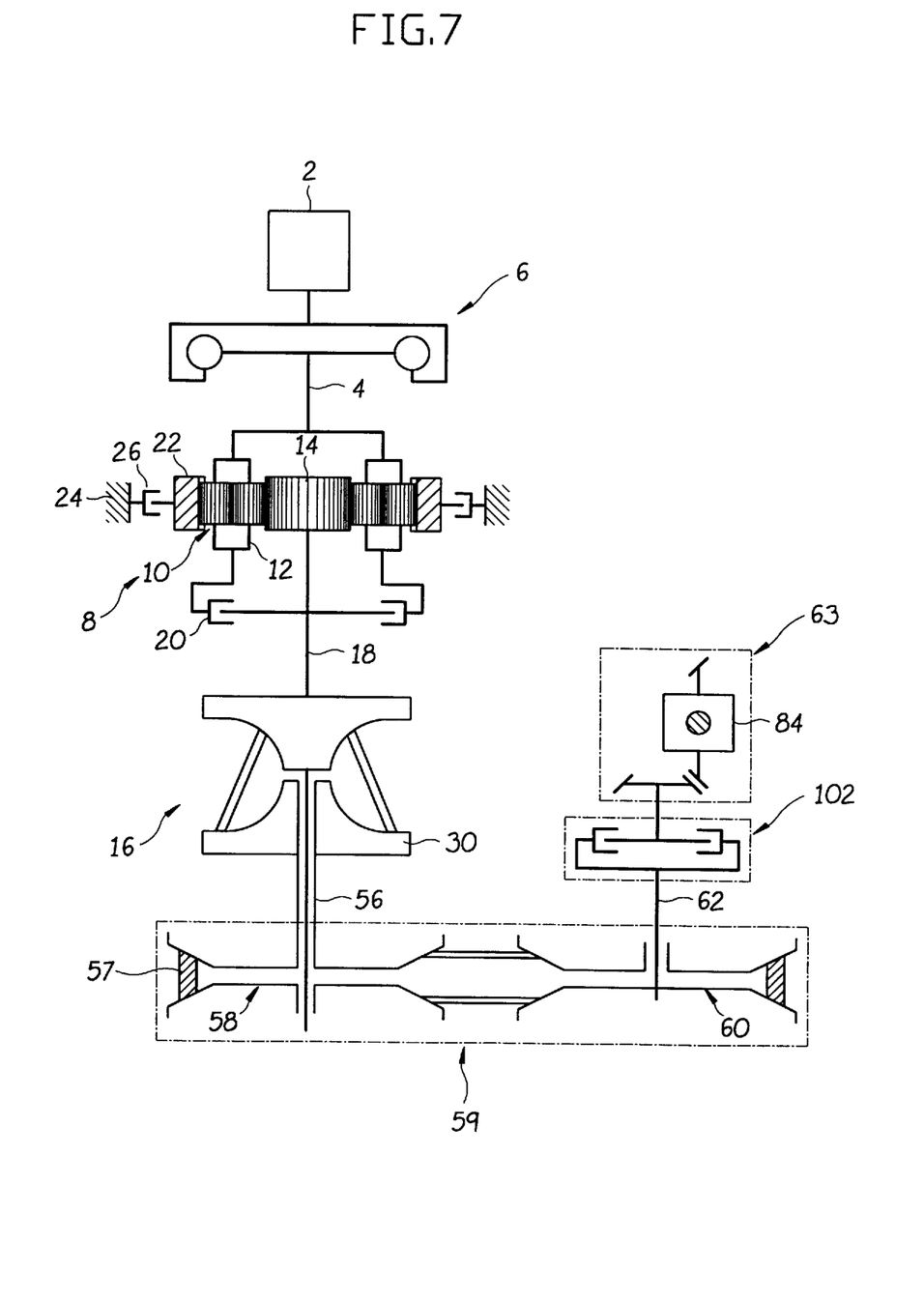
FIG. 7 is a schematic diagram illustrating a continuously variable transmission according to a third embodiment of the present invention.

FIG. 7 shows a third embodiment of the present invention. The difference between the first and third embodiment is that in the third embodiment there is provided a start control mechanism 102 between the second continuously variable shift part 59 and the final reduction gear system 63.

The start control part 102 is comprised of a multiple disk clutch so as to selectively control power transmitted to the final reduction gear system 63 through the first and second continuously variable shift parts 16 and 59.

Figure 8:
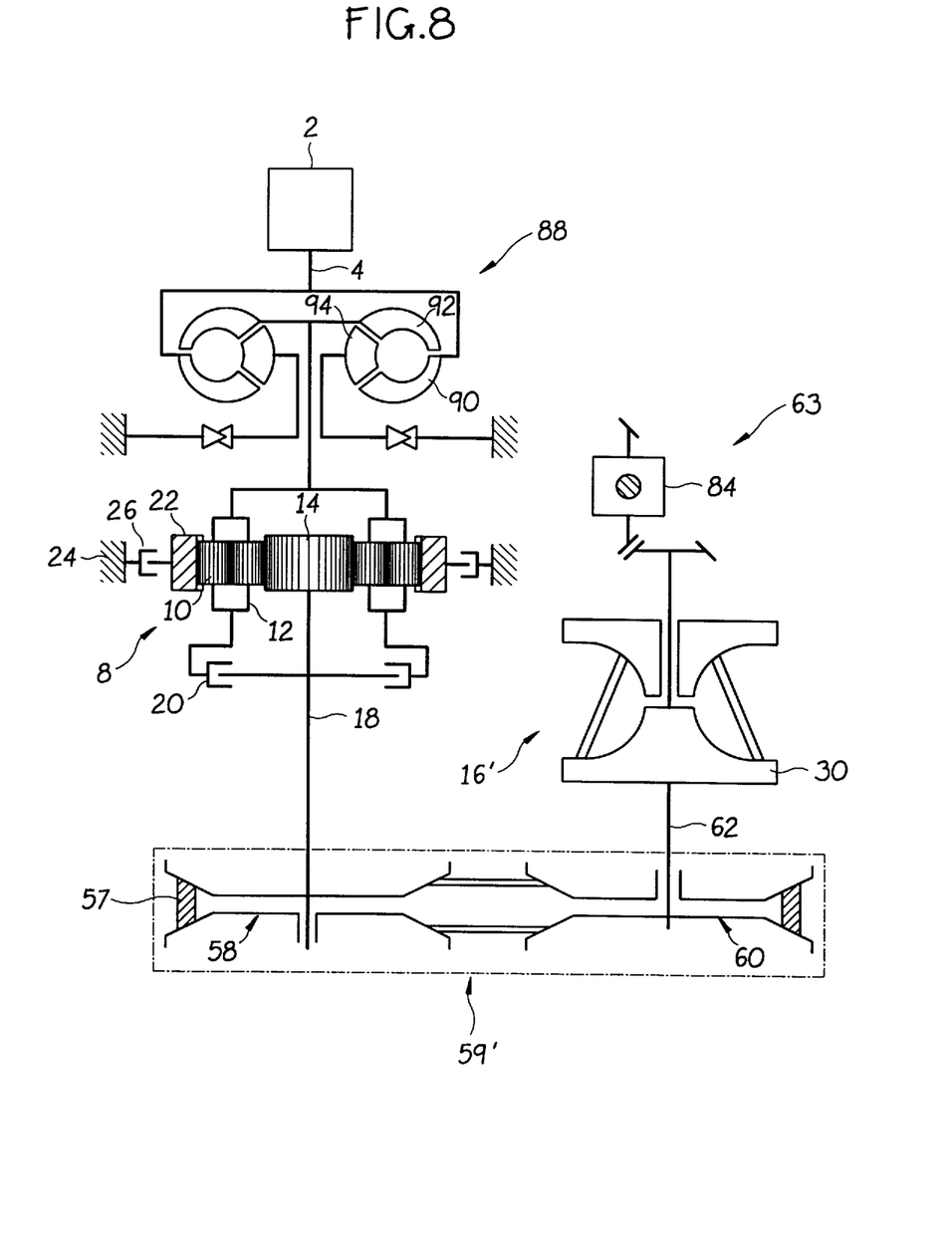
FIG. 8 is a schematic diagram illustrating a continuously variable transmission according to a fourth embodiment of the present invention.

FIG. 8 shows a fourth embodiment of the present invention. The difference between this fourth embodiment and the preceding embodiments is the arrangement of the first and second continuously variable shift parts 16 and 59.

That is, in this embodiment, the second continuously variable shift part 59 which is operated by the endless belt 57 in the preceding embodiments becomes a first continuously variable shift part 59' which is connected to the forward/reverse control mechanism 8 through the first power transmission member 18, and the first continuously variable shift part 16 in the preceding embodiments becomes a second continuously variable shift part 16' which is disposed between the first continuously variable shift part 59' and the final reduction gear system 63.

This fourth embodiment is designed so as to provide a mounting advantage if mounting problems are encountered with the designs of the preceding embodiments.

Figure 9:
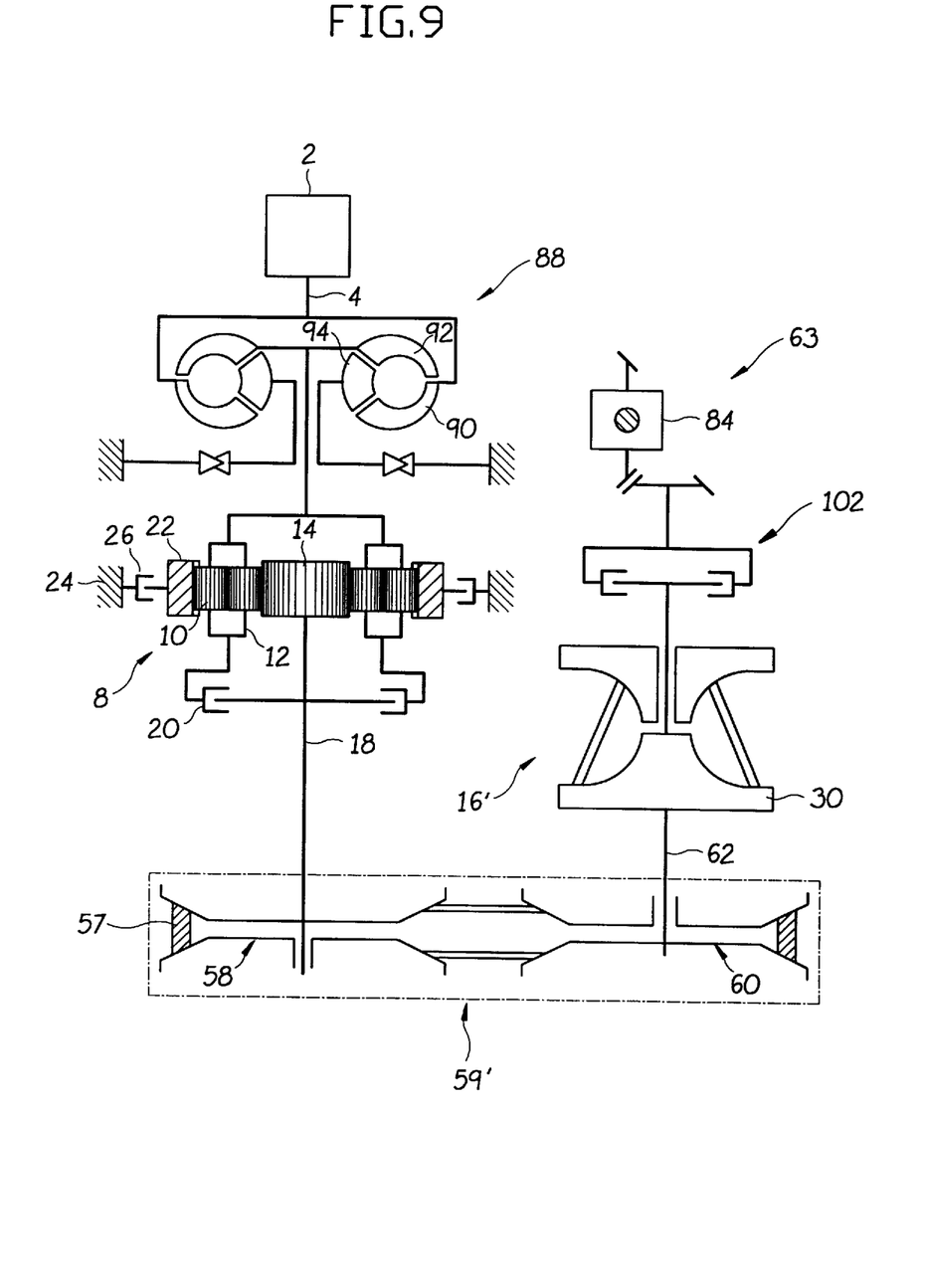
FIG. 9 is a schematic diagram illustrating a continuously variable transmission according to a fifth embodiment of the present invention.

Referring to FIG. 9, there is shown a fifth embodiment of the present invention. This fifth embodiment is similar to the fourth embodiment. The difference between the fourth and fifth embodiments is that in the fifth embodiment there is provided a start control mechanism 102 between the second continuously variable shift part 16' and the final reduction gear system 63. The start control mechanism 102 is comprised of a multiple disk clutch which allows for a smooth transition from a stopped state to a moving state.

Figure 10:
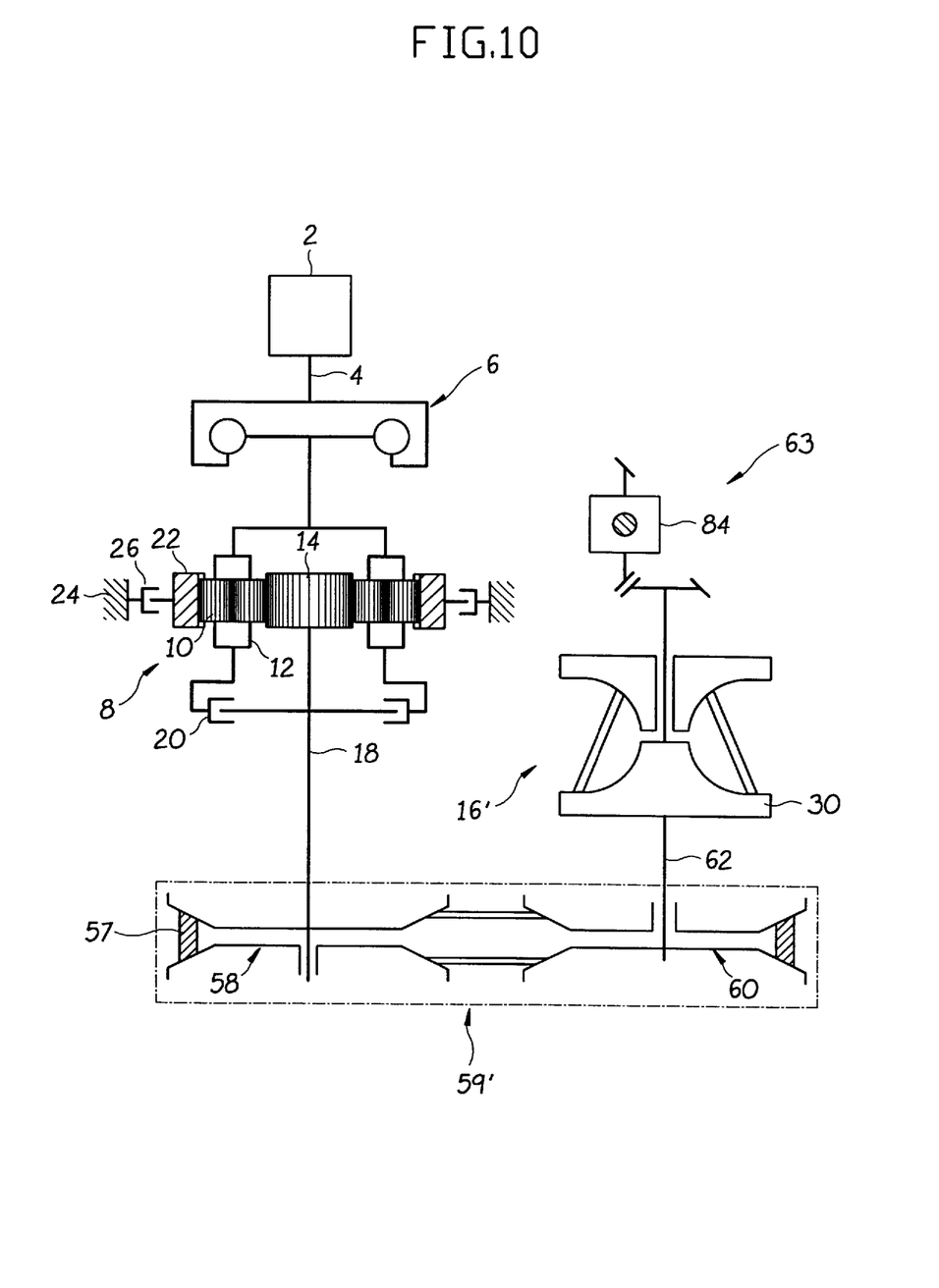
FIG. 10 is a schematic diagram illustrating a continuously variable transmission according to a sixth embodiment of the present invention.

FIG. 10 shows a sixth embodiment of the present invention. This sixth embodiment is similar to the fourth embodiment except that the torque convertor 88 is replaced with the torsional damper 6.

The operation of the above described embodiments will be described hereinafter.

When a shift selector lever (not shown) is shifted to a drive "D" range, the first friction member 20 is operated. As a result, torque of the engine 2 is generated as a forward rotating force through the planet carrier 12 and the first power transmission member 18.

The forward rotating force is transmitted to the input disk 28 of the first continuously variable shift part 16 in the first, second and third embodiments.

At this point, as shown in FIG. 4, when the roller disks 40 contact a relatively large diameter portion of the input disk 28 and a relatively small diameter portion of the output disk 30, the rotating speed increases, and when the roller disks 40 contact the same diameter portions of the input and output disks 28 and 30 as shown in one-dotted-line of FIG. 5, the rotating speed is output at a speed ratio of 1:1.

In addition, when the roller disks 40 contact the small diameter portion of the input disk 28 and the large diameter portion of the output disk 30 as shown in double-dotted line of FIG. 4, the rotating speed decreases.

The above operation of the roller disks 40 is controlled by a hydraulic control mechanism (not shown) which is operated in accordance with vehicle's running condition.

The rotating speed transmitted from the first continuously variable shift part 16 is transmitted to the second continuously variable shift part 59 through the second power transmission member 56.

The transmitted rotating force is transmitted from the drive pulley 58 to the driven pulley 60 through the belt 57.

At this point, the rotating speed changes in accordance with the diameter variation of the drive and driven pulleys 58 and 60. For example, if the belt 57 contacts the same diameter portion of the drive and driven pulleys 58 and 60, the rotating speed is output at a speed ratio of 1:1. If the diameter of the contacting portion between the belt 57 and the drive pulley 58 is larger than that between the belt 57 and the driven pulley 60, the rotating speed increases. If the diameter of the contacting portion between the belt 57 and the drive pulley 58 is smaller than that between the belt 57 and the driven pulley 57, the rotating speed decreases.

By this operation, the continuously variable shift operation is achieved from a start state to high speeds without shift steps.

The diameter variation of the drive and driven pulleys 58 and 60 is determined by hydraulic pressure fed to the hydraulic chambers 70 and 80. Since the hydraulic pressure is controlled by a control system which is used for a conventional transmission, the description thereof will be omitted.

As described above, since the shift operation is performed through first and second shift parts, the whole shift range can be enlarged in the drive "D" range.

When the shift selector lever is shifted to a reverse "R" range, the first friction element 20 is released and the second friction member 26 is applied. As a result, the planet carrier 12 of the forward/reverse control mechanism 8 becomes an input element and the ring gear 26 becomes a reacting element, whereby rotating force is transmitted to the first continuously variable shift part 16 through the sun gear 14 and further transmitted to the final reduction gear system 63 through the second continuously variable shift part 59, thereby reversing the vehicle.

While the invention has been described in connection with what is presently considered to be most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A continuously variable transmission for a vehicle, comprising:

damping means for absorbing torsional vibration caused by a change in engine torque, said damping means being connected to an output shaft of an engine;

forward/reverse control means for controlling forward and reverse drive of the vehicle, said forward/reverse control means being connected to said damping means;

first shift means for continuously variably shifting rotating force transmitted from the forward/reverse control means, said first shift means being connected to the forward/reverse control means through a first power transmission member; and second shift means for continuously variably shift rotating force, which is continuously variable shifted in said first shift means, and transmitting shifted rotating force to a final reduction gear system, said second shift means being connected to the first shift means through a second power transmission member.

2. A continuously variable transmission according to claim 1, wherein the forward/reverse control means comprises a double-pinion planet gear set.

3. A continuously variable transmission according to claim 2, wherein the double-pinion planet gear set comprises:
a sun gear;
a ring gear;
a plurality of double pinion gear sets, each of which has paired pinion gears meshing with each other and with the ring and sun gears, respectively; and
planet carriers interconnecting the paired double pinion gears, said planet carriers being connected to the output shaft of the engine so as to act as an input element,
said sun gear being connected to the first shift means through the first power transmission member so as to act as an output element, the planet carriers being connected to the first power transmission member through a first friction element so as to be selectively engaged with the sun gear according to an operation of the first friction element, and the ring gear being connected to a transmission housing through a second friction element so as to act as a reacting element in accordance with an operation of the second friction element.

4. A continuously variable transmission according to claim 1, wherein the first shift means comprises:
an input disk having a variable diameter portion;
an output disk having a variable diameter portion and disposed symmetrically with respect to the input disk;
at least one roller disk disposed between and friction-contacting the variable diameter portions of the input and output disks; and
drive means for variably moving the roller disk on the variable diameter portions.

5. A continuously variable transmission according to claim 4, wherein the input disk is splined to the first power transmission member and the output disk is coupled on the second power transmission member through a bearing.

6. A continuously variable transmission according to claim 4, wherein the drive means comprises:
a supporting member supporting the roller disk;
journal and pinion respectively mounted opposite ends of the supporting member; and
a rack meshing with the pinion, the rack reciprocating by hydraulic pressure applied to pistons disposed on opposite ends of the rack, thereby rotating the pinion.

7. A continuously variable transmission according to claim 1, wherein the damping means comprises a torsional damper.

8. A continuously variable transmission according to claim 1, wherein the damping means comprises a torque convertor.

9. A continuously variable transmission according to claim 1, wherein the second shift means comprises:
a drive pulley assembly having fixed and variable pulleys so as to vary diameter thereof, the drive pulley being connected to the first shift means through the second power transmission member; and
a driven pulley assembly having fixed and variable pulleys so as to vary diameter thereof, the driven pulley being connected to the final reduction gear system through the third power transmission member.

10. A continuously variable transmission according to claim 1 further comprising a start control means disposed on the third power transmission member connecting the second shift means and the final reduction gear system.

11. A continuously variable transmission according to claim 1, wherein the start control means comprises a multi-plate clutch.

12. A continuously variable transmission according to claim 1, wherein the first shift means comprises:
a drive pulley assembly having fixed and variable pulleys so as to vary diameter thereof, the drive pulley being connected to the forward/reverse control means through the first power transmission member; and
a driven pulley assembly having fixed and variable pulleys so as to vary diameter thereof, the driven pulley being connected to the second shift means through the second power transmission member.

13. A continuously variable transmission according to claim 1, wherein the second shift means comprises:
an input disk having a variable diameter portion, the input disk being connected to the first shift means through the second power transmission member;
an output disk having a variable diameter portion and disposed symmetrically with respect to the input disk, said output disk being connected to the final reduction gear system through the third power transmission member;
at least one roller disk disposed between and friction-contacting the variable diameter portions of the input and output disks; and
drive means for variable moving the roller disk on the variable diameter portions.

14. A continuously variable transmission according to claim 1, wherein the first shift means comprises:
an input disk having a variable diameter portion, the input disk being connected to the forward/reverse control means through the first power transmission member;
an output disk having a variable diameter portion and disposed symmetrically with respect to the input disk, the output disk;
at least one roller disk disposed between and friction-contacting the variable diameter portions of the input and output disks; and
drive means for variable moving the roller disk on the variable diameter portions, and
wherein the second shift means comprises:
a drive pulley assembly having fixed and variable pulleys so as to vary diameter thereof, the drive pulley being connected to the output disk of first shift means through the second power transmission member; and
a driven pulley assembly having fixed and variable pulleys so as to vary diameter thereof, the driven pulley being connected to the final reduction gear system through the third power transmission member.

15. A continuously variable transmission according to claim 13 further comprising a start control means disposed on the third power transmission member connecting the driven pulley of the second shift means and the final reduction gear system.

16. A continuously variable transmission according to claim 1, wherein the first shift means comprises:
a drive pulley assembly having fixed and variable pulleys so as to vary diameter thereof, the drive pulley being connected to the forward/reverse control means through the first power transmission member; and
a driven pulley assembly having fixed and variable pulleys so as to vary diameter thereof, the driven pulley being connected to the second shift means through the second power transmission member, and
wherein the second shift means comprises:
an input disk having a variable diameter portion, the input disk being connected to the driven pulley assembly of the first shift means through the second power transmission member;

an output disk having a variable diameter portion and disposed symmetrically with respect to the input disk, said output disk being connected to the final reduction gear system through the third power transmission member;

at least one roller disk disposed between and friction-contacting the variable diameter portions of the input and output disks; and drive means for variable moving the roller disk on the variable diameter portions.

17. A continuously variable transmission according to claim 16 further comprising a start control means disposed on the third power transmission member connecting the output roller disk of the second shift means and the final reduction gear system.

* * * * *